United States Patent
Abichandani et al.

(10) Patent No.: US 7,440,440 B1
(45) Date of Patent: Oct. 21, 2008

(54) METHOD AND SYSTEM FOR DEVICE-BASED CALL PARK AND PICK-UP

(75) Inventors: Jaideep Abichandani, Carol Stream, IL (US); Anoop Tripathi, Lake Zurich, IL (US); Hui Dai, Itasca, IL (US); Sangaravelan Singaraselvan, Schamburg, IL (US)

(73) Assignee: 3Com Corporation, Marlborough, MA (US)

( * ) Notice: Subject to any disclaimer, the term of this patent is extended or adjusted under 35 U.S.C. 154(b) by 828 days.

(21) Appl. No.: 10/734,560

(22) Filed: Dec. 12, 2003

(51) Int. Cl.
*H04L 12/28* (2006.01)
*H04L 12/56* (2006.01)

(52) U.S. Cl. .................. 370/351; 370/389; 370/395.1

(58) Field of Classification Search ............... 370/537, 370/351, 389, 395.1
See application file for complete search history.

(56) References Cited

U.S. PATENT DOCUMENTS

| | | | | |
|---|---|---|---|---|
| 5,754,627 A | * | 5/1998 | Butler et al. | 455/414.1 |
| 5,970,134 A | * | 10/1999 | Highland et al. | 379/265.02 |
| 6,044,144 A | * | 3/2000 | Becker et al. | 379/265.02 |
| 6,473,437 B2 | * | 10/2002 | Stumer | 370/462 |
| 2004/0148395 A1 | * | 7/2004 | Schulzrinne | 709/227 |
| 2004/0240656 A1 | * | 12/2004 | Poustchi | 379/220.01 |

OTHER PUBLICATIONS

U.S. Appl. No. 60/473,877 Specification and Drawings.*

Levin, O., *H.323 Uniform Resource Locator (URL) Scheme Registration*, Network Working Group, Request for Comments 3508, Apr. 2003, pp. 1-5.
Cuervo, F. et al., *Megaco Protocol Version 1.0*, Network Working Group, Request for Comments 3015, Nov. 2000, pp. 1-139.
Arango, M. et al., *Media Gateway Control Protocol (MGCP) Version 1.0*, Network Working Group, Request for Comments 2705, Oct. 1999, pp. 1-102.
Johnston, A. et al., *Session Initiation Protocol Service Examples* <draft-ietf-sipping-service-examples-05>, Internet Working Draft, Aug. 29, 2003, pp. 1-166.
Schulzrinne, H. et al., *RTP: A Transport Protocol for Real-Time Applications*, Network Working Group, Request for Comments 1889, Jan. 1996, pp. 1-60.

(Continued)

*Primary Examiner*—Edan Orgad
*Assistant Examiner*—Blanche Wong
(74) *Attorney, Agent, or Firm*—McDonnell Boehnen Hulbert & Berghoff LLP

(57) ABSTRACT

A method for call parking in a network telephony system is disclosed. A first user agent and a second user agent establish a communication session, and the second user agent enters a call park number to initiate a call park of the communication session. Subsequently, the call park number and the location of the second user agent are sent to a server, which authorizes the second user agent for call parking. The server then registers the call park number, and the communication session between the first and second user agents is parked. When a third user agent wants to pick up the communication session, the third user agent calls the server by entering the call park number. The server then routes the third user agent to the second user agent, which in turn refers the third user agent to the first user agent. The first and third user agents then establish their own communication session, the communication session between the first and second user agents is terminated, and the call park number is deregistered.

19 Claims, 3 Drawing Sheets

OTHER PUBLICATIONS

Schulzrinne, H. et al., *Real Time Streaming Protocol (RTSP)*, Network Working Group, Request for Comments 2326, Apr. 1998, pp. 1-71.

Rosenberg, J. et al., *SIP: Session Initiation Protocol*, Network Working Group, Request for Comments 3261, Jun. 2002, pp. 1-209.

* cited by examiner

METHOD AND SYSTEM FOR DEVICE-BASED CALL PARK AND PICK-UP

FIELD OF INVENTION

The present invention relates to network telephony services and, more particularly, to a method and system for device based call parking and pick up.

BACKGROUND

Internet protocol ("IP") telephony and IP multimedia networks employ several protocols to setup and manage calls and sessions. One of the most widely adopted protocols for IP-based signaling is Session Initiation Protocol ("SIP"). SIP is used, for example, for initiating new calls and sessions, manipulating call paths, and enabling the association of services with users regardless of their point of connection in the network. These are just a few areas of SIP application.

The increasing use of SIP has spurred development and introduction of numerous services with SIP interfaces for the user and network access. This approach makes sense as the number of SIP-capable devices proliferates in IP networks. These devices have several features and mechanisms defined to employ existing telephony features in SIP.

One such feature is call parking. Call parking is a commonly used feature in today's deployed telephony solutions, especially in office environments. As an example, consider a First user and a Second user in a telephony conversation and the Second user wants to move to another location during the conversation. Suppose it is not possible to physically move the device being used by the Second user to the new location, and also that the Second user does not want to hang up the call and fully re-originate the call for any particular reason. Therefore, the Second user presses a button(s) on the device that parks the call at a park server. The Second user then moves to the new location and retrieves the parked call by calling the First user. This process of call retrieval is referred to as call pick up.

Unfortunately, however, existing SIP-based call parking solutions have several drawbacks. For example, one solution requires the Second user to re-originate the call at the new location by sending a call-pickup origination request to the First user. Therefore, in this solution, although the call will be parked in a normal fashion for the First user (e.g., similar to generally accepted call park functions), the Second user essentially hangs up and recalls the First user to park and pick-up the call. One problem with this technique is that it requires advanced feature handling in a handset device so that the handset at the new location has the capability of sending detailed call-pickup origination requests. Such a feature does not exist in most of the commercially available SIP devices. Therefore, using this solution would require upgrades of most handsets in the network.

Another problem with existing solutions for picking-up the call at the new location is that the Second user must know the SIP address of the First user in order to re-originate the call. The SIP address of the First user may not be known, however, if the First user is calling from a payphone and does not know the phone number of the payphone, or if the First user is an anonymous caller, for example. The proposed solution further assumes that from the new location, the Second user will have calling privileges to call the First user. Moreover, if the Second user has not subscribed to a caller ID feature, then the Second user requires the First user to reveal its SIP address. This could be a privacy issue.

Furthermore, a major problem with the proposed solution of the prior art is that service providers have no control over the call park/call pick up feature. The park server is provided for parking the call. However, the park server is not involved in the pickup process except for being asked to disconnect the parked call, because the Second user picks up the call by re-originating a call with the First user from the new location (e.g., the Second user simply calls the First user again from the new location). The parked call (i.e., the communication session between the First user and the park server) can be dropped due to any reason (e.g., the First user getting impatient and hanging up). As a result, it is difficult for the service provider to know whether a successful call pick up occurred. This implies that the service provider will have difficulty charging for the call pick up feature and may have no incentive to provide this service.

Finally, another major drawback in the currently proposed solutions is that a dedicated Park Server in the network is required. To implement the call park feature, currently, a network would have to deploy a dedicated machine to do the Park server functionality. To have a network deploy a dedicated machine to do the Park server functionality would drastically increase ownership costs. Thus, the currently proposed solution is unlikely to be deployed.

Accordingly, it would be desirable to have a system and method for handling call parking and call pick up without the above described drawbacks and disadvantages.

SUMMARY

In an exemplary embodiment, a method for call parking in a network telephony system is provided. The method includes a first user agent and a second user agent establishing a communication session. The method also includes the second user agent entering a call park number to initiate a call park of the first communication session, and subsequently sending the call park number to the server which authorizes the second user agent. The server then registers the call park number at the server, thereby parking the first communication session.

When a third user agent wants to pick up the first communication session, the third user agent calls the server by entering the call park number. The server then routes the third user agent to the second user agent and establishes a second communication session between the third user agent and the second user agent. The method further includes the second user agent sending to the third user agent the address of the first user agent during the second communication session. Thus, the third user agent and the first user agent establish a third communication session.

The method further provides that when the third user agent and the first user agent are communicating, the first communication session between the first user agent and the second user agent terminates. At that point the second user agent will deregister the call park number at the server and terminate the second communication session between the second user agent and the third user agent.

DETAILED DESCRIPTION OF EXEMPLARY EMBODIMENTS

Exemplary Network Arrangement

Figure 1:
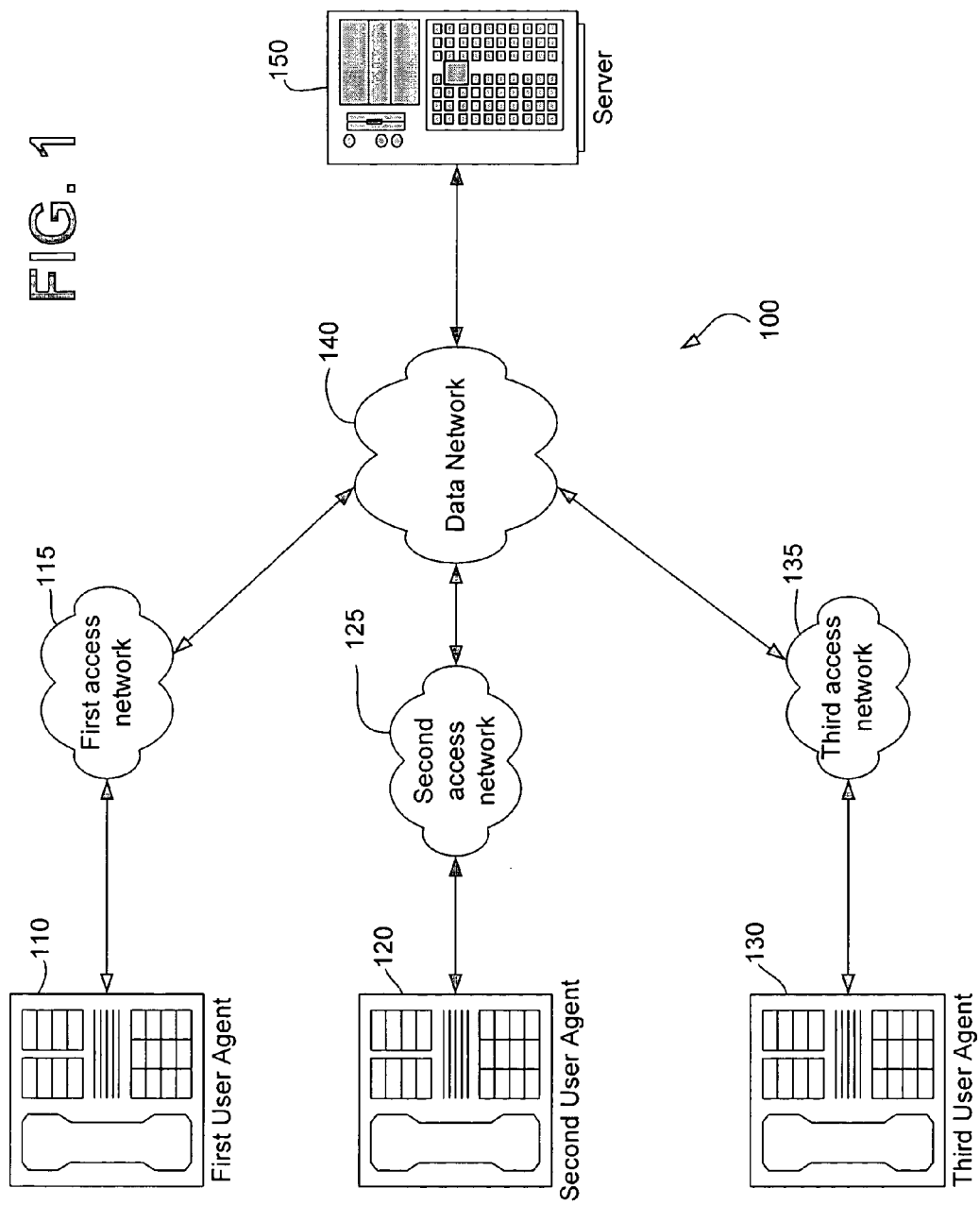
FIG. 1 is a simplified block diagram illustrating one exemplary embodiment of a network telephony system according to the present invention.

Referring to the drawings, FIG. 1 is a simplified block diagram illustrating a communication system 100 in which an exemplary embodiment of the present invention can be employed. It should be understood, however, that this and other arrangements described herein are set forth for purposes of example only. As such, those skilled in the art will appreciate that other arrangements and other elements can be used instead, and some elements may be omitted altogether.

In the exemplary embodiment, a signaling protocol used in the system 100 is the Session Initiation Protocol ("SIP") signaling protocol. Other signaling protocols, such as H.323, Media Gateway Control Protocol ("MGCP"), Media Gateway Control Protocol ("MEGACO"), and other standard or proprietary techniques may alternatively be used. Internet Engineering Task Force ("IETF") Requests For Comments ("RFC") 3508 that describes H.323 protocol, RFC 2705 that describes MGCP, and RFC 3015 that describes MEGACO are each entirely incorporated by reference herein, as if fully set forth in this description. Before describing the exemplary embodiment of the telephony network shown in FIG. 1, a brief overview of the SIP will be described herein.

SIP Overview

SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination and may use other protocols to do so, such as Real Time Protocol ("RTP") for transporting real-time data and providing Quality of Service ("QoS") feedback, and the Real-Time Streaming Protocol ("RTSP") for controlling delivery of streaming media. RFC 1889 that describes RTP and RFC 2326 that describes RTSP are both entirely incorporated by reference herein, as if fully set forth in this description. SIP is an application layer protocol that may run over the user datagram protocol ("UDP") or the transport control protocol ("TCP"), for example.

SIP supports a variety of services, including locating a callee, determining the callee's capabilities, and handling the mechanics of call setup and termination, for example. SIP defines telephone numbers as uniform resource locators ("URLs"), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system ("DNS") of 3Com. SIP URLs may also contain other addresses or actual telephone numbers.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

As an example, consider the following exemplary text encoded message.

```
INVITE sip:user@biloxi.com SIP/2.0
Via: SIP/2.0/UDP pc33.atlanta.com;branch=z9hG4bK776asdhds
Max-Forwards: 70
To: User<sip:user@biloxi.com>
From: Sender<sip:sender@atlanta.com>;tag=1928301774
Call ID: a84b4c76e66710@pc33.atlanta.com
CSeq: 314159 INVITE
Contact: <sip:sender@pc33.atlanta.com>
Content-Type: application/sdp
Content-Length: 142
```

The first line of this text-encoded message contains the method name (e.g., INVITE). The lines that follow are a list of header fields. For example, the header fields are Via (describing the address at which the user is expecting to receive responses), To (contains a display name or SEP request-URI towards which the request was originally directed), From (contains a display name and a SIP request-URI that indicate the originator of the request), Call ID (contains a globally unique identifier for this call), CSeq (a traditional sequence number), Contact (contains a SIP request-URI that represents a direct route to contact the sender), and Content-Type (information about the type of session that should be established, e.g., the Session Description Protocol ("SDP"), which describes parameters like type of media streams). In addition, the From header also has a tag parameter containing a random string (e.g., 1928301774) that is used for identification purposes.

Other example methods are provided below in Table 1.

TABLE 1

| METHOD | DESCRIPTION |
| --- | --- |
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the user's current location |
| NOTIFY | Indicates the status of a request |
| REFER | Requests that the party sending the REFER be notified of the outcome of the referenced request |

To establish a call session between two or more user agents, one user agent would send to another an INVITE message. The transmission of the INVITE message may use TCP or UDP protocol, for example. In either case, the headers on the second and subsequent lines of INVITE message describe the structure of the message body, which contains the calling user agent's capabilities, media types, and formats. The INVITE message also contains a user identifier to identify the called user agent, a user identifier to identify the calling user agent, and a session description that informs the called user agent what type of media the calling user agent can accept and where the calling user agent wishes the media to be sent. User agent identifiers in SIP requests are known as SIP addresses. SIP addresses are referred to as Universal Resource Indicators (SIP request-URIs), which are of the form sip:user@host.domain. Other addressing conventions may also be used.

Upon receiving the INVITE request, the called user agent may transmit a response message ACK to the calling user agent, and if the called user agent accepts the call, the called user agent will respond with a 200 OK message. Following the reply code line, the called user agent may also supply information about its capabilities, media types and formats.

If the transmitted response message is a success, the calling user agent may send an ACK message back to the called user agent to confirm receipt of the 200 OK message and complete the call initiation process. After the call has been initiated using the SIP signaling protocol, the call is connected and media data (including voice information, etc.) can flow on a data channel between the user agents and through an access and a data network.

Other methods described in Table 1 can be used throughout the call session. For example, either party may request termination of a session by sending a message containing the BYE method. When the other side acknowledges the BYE method, the session is terminated. As another example, the OPTIONS method may also be used to query a user agent about its own capabilities. The OPTIONS method is typically used before a session is initiated to determine if that the user agent is even capable of SIP or whatever type of session is being contemplated.

Furthermore, the REGISTER method relates to SIP's ability to track down and connect to a user whose location may not be associated with a single, fixed phone or client device. This message is sent to a SIP location server to inform the location server of who is where. That server can later be queried to find a user's current location. User agents have pre-programmed device identifiers (e.g. phone numbers), represented as SIP request-URI's that are of the form sip: user@domain. An example is sip: 1234567890@sample.com. After power-up, each of the user agent may send a SIP REGISTER message to the default registrar to inform the registrar of the user agents' address and location.

When a call arrives at the proxy server for any of the registered SIP request-URIs, a server will forward the call to the appropriate destination. If a network phone is moved to a new location, all calls to the associated SIP request-URI will still be properly routed to that device. Alternatively, if a user moves to a different phone, that user may inform the server of the location of the new phone, so that the user's SIP request-URI may be mapped to that new phone. In other words, a SIP system can provide device mobility since calls will "follow" the network phone or the user according to the network phone's or user's SIP request-URI. This is useful if network phones run the Dynamic Host Configuration Protocol ("DHCP") so that when the location is changed, the IP address is also automatically changed.

As illustrated in FIG. 1, the exemplary communication system 100 includes a first user agent 110, a second user agent 120, and a third user agent 130. In one exemplary embodiment, the user agents 110, 120, and 130 are SIP-based network phones having a key pad used to input a call park number and a logic component that accepts and sends messages between user agents 110, 120 and 130. Although the user agents 110, 120, and 130 are shown as network phones, other implementations may also be used. For example, the user agents 110, 120, and 130 may be personal computers with software to perform SIP user agent functions, and user interface hardware, such as a microphone and a headphone to communicate voice information. Other user interfaces, such as video and/or other types of communication data, may also be used, whether the devices use wired or wireless communication techniques. In addition, more user agents may be included in the system 100 than those shown in FIG. 1.

The user agents 110, 120, and 130 may receive calls from each other or from devices on other types of communication networks, such as from telephones located on the Plain Old Telephone System ("POTS") or on the Public Switched Telephone Network ("PSTN"), when appropriate gateways are implemented in the system 100.

The user agents 110, 120, and 130 are connected to access networks 115, 125, and 135, respectively, which can be any type of access network that connects the user agents 110, 120, and 130 to the data network 140. For example, the access networks 115, 125, and 135 may be Wide Area Networks ("WAN"), Local Area Networks ("LAN"), or others. The access networks 115, 125, and 135 are connected to the data network 140, which can be a public Internet or another transport network.

Also connected to the data network is a server 150. The server preferably has a registry for call park numbers, a validation function, a look-up function for looking up call park numbers and correlating the call park numbers with communication sessions, and a logic component for sending messages to and receiving messages from user agents 110, 120, and 130. For example, the server can be SIP based proxy server or another server that is able to receive a call park number from a user agent, such as first user agent 110, validate the user agent, and temporarily store the call park number so as to allow another user agent (e.g. third user agent 130) to pick up a parked call. The server 150 can also provide other functions, such as authentication of user agents 110, 120, 130. Also, the server 150 can provide network access control, routing, reliable request transmission and retransmission, and security.

Method for Call Parking and Pick Up

Figure 2:
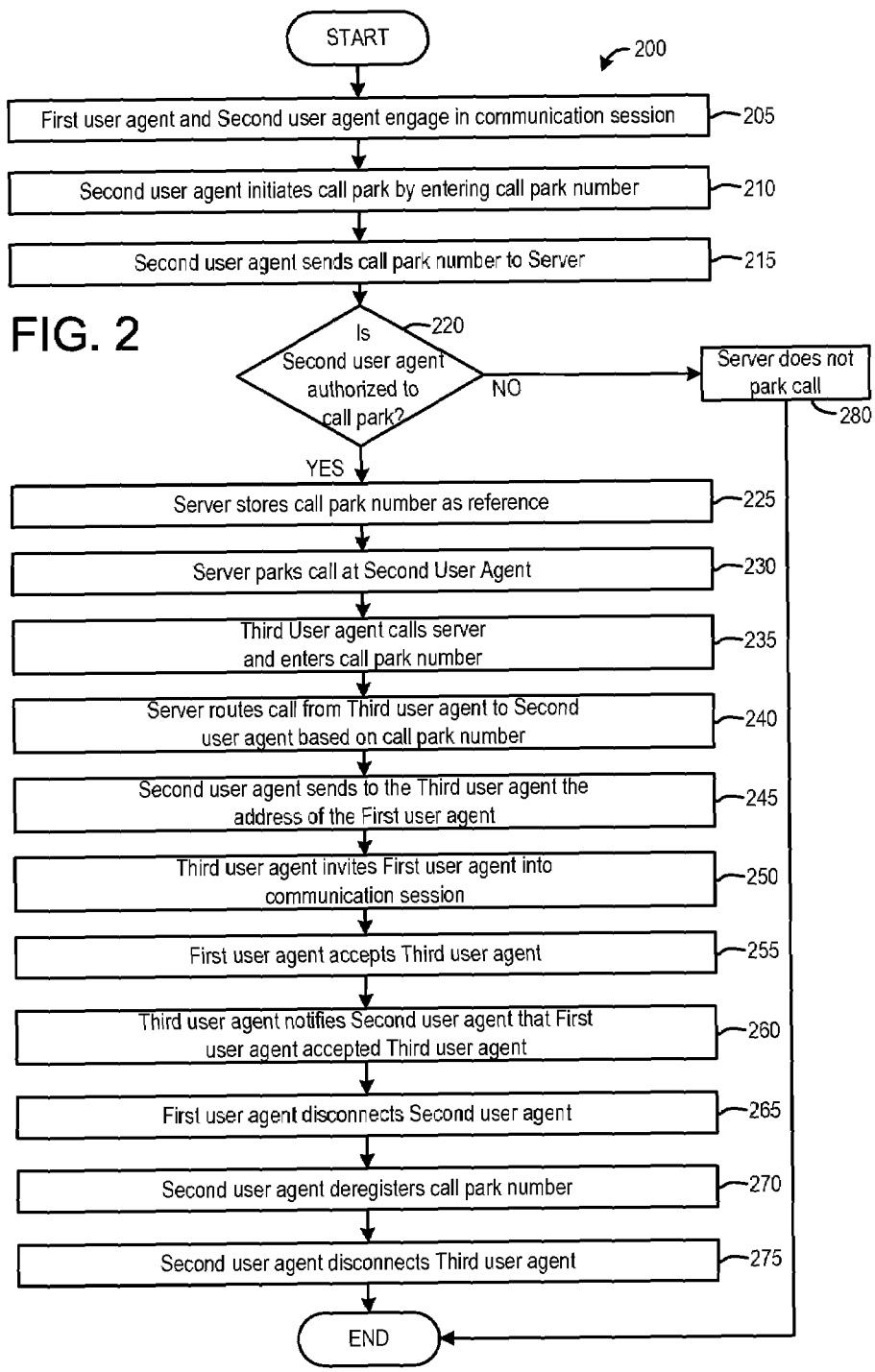
FIG. 2 is a flow chart depicting one embodiment of a method of call parking and call pick-up within a network telephony system in accordance with the exemplary embodiment.

FIG. 2 is a flow chart depicting one embodiment of a method 200 of call parking and call pick-up within a network telephony system. Initially, a First user agent and a Second user agent engage in a communication session at step 205. The Second user agent may then wish to park the communication session and may do so by entering a call park number, as shown at step 210. To carry out the call parking, the Second user agent will send the call park number to a server, as shown at step 215. Along with the call park number, the Second user agent preferably sends its location information (e.g., IP address) to the server. The server will then authenticate the Second user agent to make sure it is authorized for call parking, as shown at step 220.

If the Second user agent is not authorized for parking a communication session, the server will not park the call, as shown at step 280. At this point, the call park session will be terminated, and the communication session between the First and Second user agents continues without a call park.

If the Second user agent is authorized for parking a communication session, the server will proceed with parking the call. A user agent can be authorized by the server confirming that the entered call park number is a valid call park number, that the user operating the user agent is a user who has subscribed to the call park feature (or will be charged for the call park), that the user agent is a device approved for parking calls at the server, and other similar means. After the Second user agent is authorized for call parking, the server will register the call park number as a reference for the communication session between the First and Second user agents, as shown at step 225, and use that reference to identify the communication session. Preferably, the server will store the call park number in a table together with the corresponding location information (e.g., IP address) of the user agent initiating the call park (e.g., the Second user agent). After registering the call park number, the server will park the call successfully at the Second user agent as depicted at step 230.

When a Third user agent wants to pick up the parked communication session, the Third user agent will enter the call park number, as is depicted in FIG. 2 at step 235. The Third user agent may be operated by the same user who operated the Second user agent, or alternatively, the Third user agent may be operated by a new and different user. By entering the call park number, the Third user agent will call the server, alerting the server that it is seeking to pick up the parked communication session identified by the entered call park number. The server will then route the call based on the call park number from the Third user agent to the Second user agent, as shown at step 240, preferably by using the previously mentioned storage table and its location information. The Second user agent will then send to the Third user agent the First user agent's address, at step 245.

Thereafter, using that address, the Third user agent will invite the First user agent into a communication session, in step 250. The communication session between the First and Third user agents is preferably the same communication session that was between the First and Second user agents, which the Second user agent parked. Thus, when the Third user agent invites the First user agent into a communication session, the operator of the First user agent actually continues the same communication session he or she was in when communicating with the operator of the Second user agent. The only difference being that now, the operator of the First user agent talks to the same operator who is at a different location, or to a completely new operator.

Next, in step 255, the First user agent accepts the communication session with the Third user agent, and the communication session between the First and Third user agent is successfully established. The Third user agent will then notify the Second user agent about the First user agent's acceptance, as at step 260. In step 265, the First user agent will disconnect the Second user agent. Finally, the Second user agent will deregister the call park number at the server and disconnect the Third user agent in steps 270 and 275, respectively. At this point, the call park session is completed, and the communication session continues between the First and Third user agents.

It should be understood that while the above method 200 is described as the Second user agent parking the first communication with the First user agent, the method 200 works just as well if the First user agent decides to park the first communication with the Second user agent. It should also be understood that the user agent initiating the call park is not dependent on whether or not that user agent initiated the first communication to begin with.

Method of SIP Call Parking and Pick Up

Figure 3:
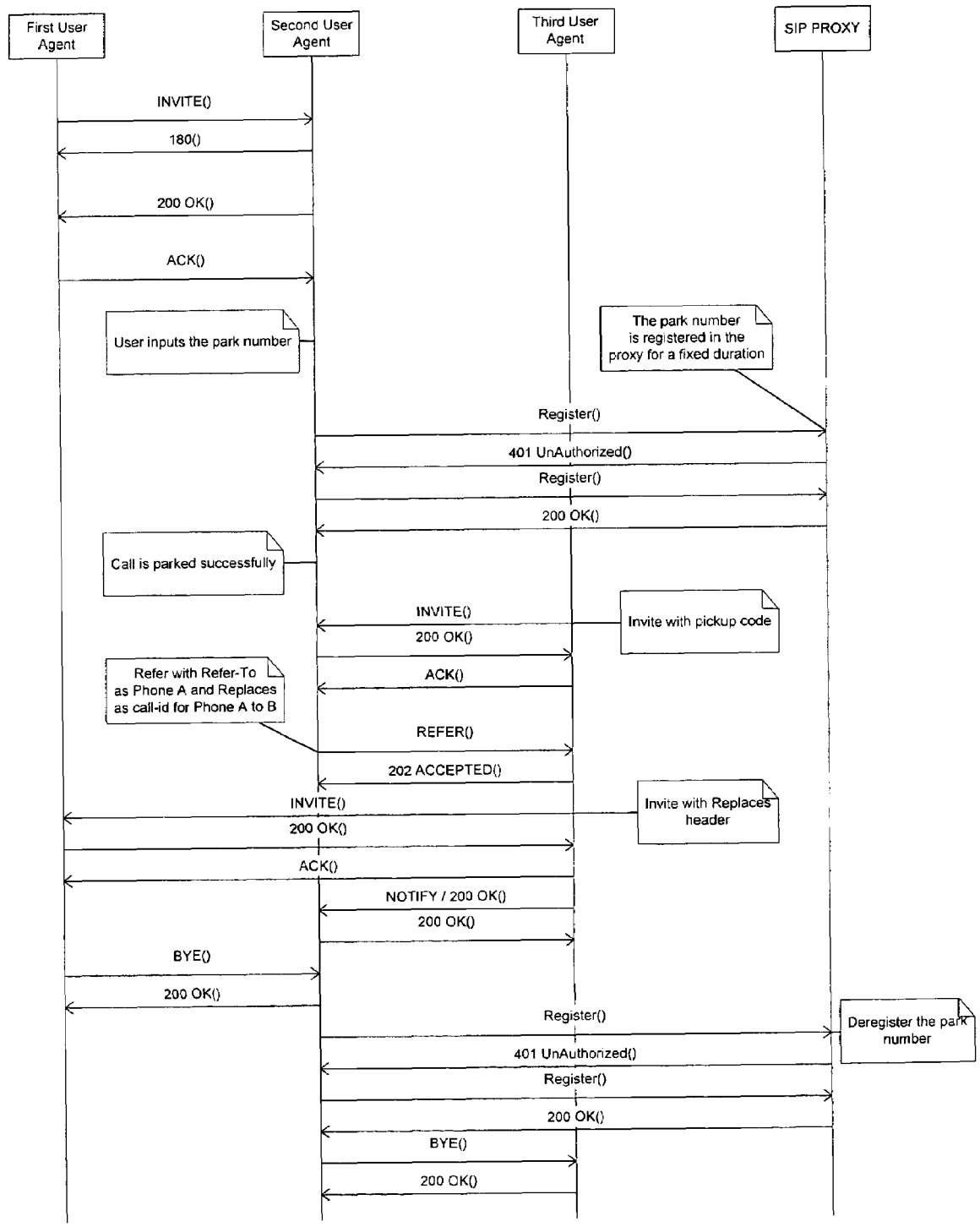
FIG. 3 is a message flow diagram illustrating one example of call parking and call pick-up within a SIP network telephony system in accordance with the exemplary embodiment.

FIG. 3 is a message flow diagram illustrating one example of call park within a network telephony system according to the exemplary embodiment. The SIP signaling within FIG. 3 may be used to carry out the method depicted in FIG. 2, for example. FIG. 3 illustrates the First user agent 110, the Second user agent 120, the Third user agent 130, and a server 150 engaged in signaling, which may occur through any number of network transport elements, such as access networks, or data networks. Further, the example in FIG. 3 is illustrated using SIP. However, other protocols may also be used, such as the H.323 call control protocol. Also, for the example illustrated in FIG. 3, the First user agent, the Second user agent, and the Third user agents are SIP-based network phones, and the server is an SIP proxy server.

In the example illustrated in FIG. 3, the First user agent initiates a communication session with the Second user agent by sending an INVITE message to the Second user agent. The Second user agent sends a 180 response message to the First user agent to indicate ringing. Once the Second user agent accepts the INVITE message, the Second user agent sends a 200 OK message to the First user agent, which responds with an ACK message. The First user agent and the Second user agent are then in conversation through an RTP media session. It should be understood, however, that the Second user agent may have initiated the communication session with the First user agent by simply reversing the call flow and messages, and that the present SIP call parking example is not restricted to any one particular user agent initiating the communication session.

The Second user agent then decides to park the call. The Second user agent then enters a call park number and sends a REGISTER message to the SIP proxy server. The REGISTER message preferably contains both the call park number and the location information (e.g., IP address) for the user agent initiating the call park (e.g., the Second user agent). Once the SIP proxy server receives the REGISTER message from the Second user agent, the SIP proxy server registers the call park number for a fixed duration of time. The SIP proxy server then challenges this REGISTER request by sending to the Second user agent a 401 UnAuthorized message. The Second user agent then resends the REGISTER request with proper authorization, to which the SIP proxy responds with a 200 OK message. At this point, the call is successfully parked at the Second user agent. Upon successful call parking authorization, the SIP proxy server adds the call park number to its registration database, along with the Second user agent's location information (e.g., IP address), and the call park number is then used to later reference and uniquely identify the parked call.

Again, it should be understood that the First user agent could have also parked the call with the Second user agent, and the exemplary SIP call parking method described herein is not limited to any one particular user agent initiating the call park.

When the Third user agent decides to pick up the call, the Third user agent will enter the call park number, which will be sent to the SIP proxy server via an INVITE message. The SIP proxy server will then route the call to the Second user agent (based on the location information of the Second user agent sent in the REGISTER message) by forwarding the INVITE message to the Second user agent. In response, the Second user will send a 200 OK message to the Third user agent, and the Third user agent will then send an ACK message back to the Second user agent. Thus, while the Third user agent is calling the SIP proxy server, it is in effect communicating with the Second user agent.

The Second user agent will also send a REFER message to the Third user agent with the "Refer-To" field as the First user agent's address and "Replaces" field as the call properties of the call between the First and Second user agents. When the Third user agent receives this REFER message, the Third user agent will send a 202 ACCEPTED message back to the Second user agent and initiate an INVITE message to the First user agent. The First user agent will then send a 200 OK message back to the Third user agent, which will in turn, send an ACK message to the First user agent.

Once the Third user agent and the First user agent are in communication, the Third user agent will send NOTIFY/200 OK messages to the Second user agent, and the Second user agent will respond with its own 200 OK message to the Third user agent. Then, the First user agent will terminate its communication session with the Second user agent by sending to the Second user agent a BYE message, to which the Second user agent will reply with a 200 OK message.

Finally, the Second user agent will want to deregister the call park number at the SIP proxy server, and so it will send a REGISTER message to the SIP proxy server with deregistration instructions. The server will then again engage the Second user agent in a standard challenge to the REGISTER request by issuing a 401 UnAuthorized message. The Second user agent will in turn respond with another REGISTER message, which the SIP proxy server will accept and send a 200 OK message to the Second user agent. Thereafter, the Second user agent will terminate its communication with the Third user agent by sending a BYE message to the Third user agent, and to complete the session, the Third user agent will send to the Second user agent the a 200 OK message.

The invention provides several advantages over the prior art solutions for call parking and pick up. For instance, the present invention does not require a dedicated park server in the network, thereby decreasing the ownership cost of such a network. Another advantage of this invention is that it eliminates the need for the party picking up a parked call to know the network address of the original party to the call. The user may not know the address of the original party to the call if that party called from a payphone and does not know the phone number of the payphone, or if the call came in from an anonymous caller.

Finally, this invention allows the service providers to have control over the call parking and call pick up features. Control is maintained by the service provider because user agents must be authorized by the server before using the call park feature. Furthermore, because the same server is involved in both parking and picking up the call, the service provider will be better able to know whether a parked call was successfully picked up, and if it was, the service provider will be able to charge for the call parking.

While exemplary embodiments have been described, persons of skill in the art will appreciate that variations may be made without departure from the scope and spirit of the invention. The true scope and spirit of the invention is defined by the appended claims, which may be interpreted in light of the foregoing.

We claim:

1. A method for call parking, the method comprising the steps of:
    establishing a first communication session between a first user agent and a second user agent in a network;
    at the second user agent, initiating a call park for the first communication session by entering a call park number;
    at a server in the network, registering the call park number as a reference for the first communication session;
    responsive to registering the call park number at the server, parking the first communication session at the second user agent;
    thereafter, at a third user agent in the network, entering the call park number;
    responsive to entering the call park number at the third user agent, establishing a second communication session between the third user agent and the second user agent using the call park number;
    sending to the third user agent from the second user agent an address of the first user agent;
    establishing a third communication session between the third user agent and the first user agent using the address of the first user agent; and
    deregistering the call park number at the server.

2. The method of claim 1, wherein registering the call park number as a reference for the first communication session comprises, at the server, authorizing the second user agent for call parking.

3. The method of claim 1, wherein registering the call park number as a reference for the first communication session comprises, at the server, storing the call park number and location information of the second user agent.

4. The method of claim 1, wherein establishing the second communication session between the third user agent and the second user agent comprises, at the server, receiving the call park number from the third user agent and responsively routing the second communication session from the third user agent to the second user agent.

5. The method of claim 4, wherein establishing the third communication session between the third user agent and the first user agent comprises referring the third user agent to invite the first user agent to initiate the third communication session.

6. The method of claim 1, further comprising the step of terminating the first communication session when the third communication session between the first user agent and the third user agent is successfully established.

7. The method of claim 1, further comprising the step of terminating the second communication session when the third communication session between the first user agent and the third user agent is successfully established.

8. The method of claim 1, wherein:
    establishing the first communication session between the first user agent and the second user agent comprises using real time protocol (RTP) media exchange between the first user agent and the second user agent;
    establishing the second communication session between the third user agent and the second user agent comprises using RTP media exchange between the third user agent and the second user agent; and
    establishing the third communication session between the third user agent and the first user agent comprises using RTP media exchange between the third user agent and the first user agent.

9. A method for call parking in a network telephony system, the method comprising the steps of:
    establishing a first communication session between a first user agent and a second user agent in a network;
    at the second user agent, initiating a call park of the first communication session by entering a call park number;
    sending the call park number from the second user agent to a server in the network;
    at the server, authorizing the second user agent for call parking;
    at the server, responsive to authorizing the second user agent for call parking, registering the call park number as a reference for the first communication session;
    parking the first communication session at the second user agent;
    thereafter, at a third user agent, entering the call park number;
    responsive to entering the call park number at the third user agent, receiving a call at the server from the third user agent;
    at the server, routing the call from the third user agent to the second user agent using the call park number;
    establishing a second communication session between the third user agent and the second user agent;
    sending to the third user agent from the second user agent an address of the first user agent by way of the second communication session;
    establishing a third communication session between the third user agent and the first user agent using the address of the first user agent;

terminating the first communication session between the first user agent and the second user agent;
deregistering the call park number at the server; and
terminating the second communication session between the second user agent and the third user agent.

10. The method of claim 9, wherein:
establishing the first communication session between the first user agent and the second user agent comprises using real time protocol (RTP) media exchange between the first user agent and the second user agent;
establishing the second communication session between the third user agent and the second user agent comprises using RTP media exchange between the third user agent and the second user agent; and
establishing the third communication session between the third user agent and the first user agent comprises using RTP media exchange between the third user agent and the first user agent.

11. The method of claim 9, wherein establishing the third communication session between the third user agent and the first user agent comprises referring the third user agent to invite the first user agent to initiate the third communication session.

12. The method of claim 9, wherein registering the call park number as a reference for the first communication session comprises at the server, storing the call park number and location information of the second user agent.

13. A method for call parking in a SIP telephony system, the method comprising the steps of:
establishing a first communication session between a first user agent and a second user agent;
at the second user agent, initiating a call park of the first communication session by entering a call park number;
sending the call park number from the second user agent to a SIP proxy server;
at the SIP proxy server, authorizing the second user agent for call parking;
at the SIP proxy server, responsive to authorizing the second user agent for call parking, registering the call park number as a reference for the first communication session;
thereafter, at a third user agent, entering the call park number;
responsive to entering the call park number at the third user agent, receiving a call at the SIP proxy server from the third user agent;
at the SIP proxy server, routing the call from the third user agent to the second user agent using the call park number;
sending an address of the first user agent from the second user agent to the third user agent;
establishing a second communication session between the third user agent and the first user agent using the address of the first user agent;
deregistering the call park number at the SIP proxy server; and
terminating the first communication session.

14. The method of claim 13, wherein:
establishing the second communication session between the third user agent and the first user agent comprises, at the first user agent, accepting the second communication session; and
terminating the first communication session comprises, at the second user agent, terminating the first communication session in response to receiving a SIP REPLACES header in conjunction with a SIP INVITE message from the third user agent.

15. The method of claim 13, wherein:
establishing the first communication session between the first user agent and the second user agent comprises using real time protocol (RTP) media exchange between the first user agent and the second user agent; and
establishing the second communication session between the third user agent and the first user agent comprises using RTP media exchange between the third user agent and the first user agent.

16. The method of claim 13, wherein sending the call park number from the second user agent to the SIP proxy server comprises sending a SIP REGISTER message to the SIP proxy server to trigger registration of the call park number as a reference for the first communication session.

17. The method of claim 13, wherein routing the call from the third user agent to the second user agent comprises forwarding a SIP INVITE message from the SIP proxy server to the second user agent.

18. The method of claim 17, wherein sending the address of the first user agent from the second user agent to the third user agent comprises sending a SIP REFER message from the second user agent to the third user agent in response to forwarding the SIP INVITE message from the SIP proxy server to the second user agent.

19. The method of claim 13, wherein registering the call park number as a reference for the first communication session comprises at the SIP proxy server, storing the call park number and location information of the second user agent.

* * * * *